United States Patent [19]

Bury

[11] Patent Number: 5,063,683
[45] Date of Patent: Nov. 12, 1991

[54] SUPPORT ASSEMBLIES

[75] Inventor: James Bury, Allestree, United Kingdom

[73] Assignee: LK Limited, Derby, England

[21] Appl. No.: 576,510

[22] PCT Filed: Apr. 5, 1989

[86] PCT. No.: PCT/GB89/00346
§ 371 Date: Apr. 5, 1989
§ 102(e) Date: Oct. 5, 1990

[87] PCT Pub. No.: WO89/09676
PCT Pub. Date: Oct. 10, 1989

[30] Foreign Application Priority Data

Apr. 8, 1988 [GB] United Kingdom ............... 8808282

[51] Int. Cl.$^5$ .................... G01B 5/00; B23Q 1/00
[52] U.S. Cl. .................................. 33/573; 33/503; 33/549
[58] Field of Search .............. 33/573, 549, 503, 567; 248/637

[56] References Cited

U.S. PATENT DOCUMENTS

| Re. 33,254 | 7/1990 | Brandsetter | 33/503 |
|---|---|---|---|
| 4,360,974 | 11/1982 | de Cuissart | 33/645 |
| 4,509,265 | 4/1985 | Donaldson | 33/573 |
| 4,523,383 | 6/1985 | Rogers et al. | 33/558 |
| 4,682,418 | 7/1987 | Tuss et al. | 33/503 |
| 4,763,420 | 8/1988 | McCabe et al. | 33/567 |
| 4,798,006 | 1/1989 | Barnaby | 33/573 |

FOREIGN PATENT DOCUMENTS

| 0240058 | 10/1987 | European Pat. Off. . |
|---|---|---|
| 926492 | 4/1947 | France . |
| 1238130 | 6/1960 | France . |
| 350152 | 12/1960 | Switzerland . |
| 2080954 | 2/1982 | United Kingdom . |

OTHER PUBLICATIONS

Design Engineering Projects, M. F. Spotts, Prentice-Hall, Inc., (1968), pp. 216–219, "Degrees of Freedom".

Primary Examiner—William A. Cuchlinski, Jr.
Assistant Examiner—Alvin Wirthlin
Attorney, Agent, or Firm—Frost & Jacobs

[57] ABSTRACT

In a co-ordinate measuring machine a base structure (10) supports guideways and carriages providing for movement of a probe adapted to contact a workpiece, and a separate structure (20) is provided for supporting the workpiece itself. The structure (20) can be supported directly on a foundation (16) by an arrangement of bars (54) capable of restraining all six degrees of freedom of movement of the structure (20), i.e. straight line movement in each of the X, Y and Z directions and rotation about each of the X, Y and Z axes. Each bar (54) is stiffened in the direction of its own axis but enables compliance in all directions normal to this axis to accommodate small movements of the structure (20) without stress or strain. The base structure (10) is mounted on the workpiece structure (20) by a similar arrangement of the bars (54) which thereby restrain all 6° of freedom of movement of the base structure (10). There is thereby avoided relative movement between the base structure (10) and the workpiece structure (20) which would otherwise result in loss of measurement accuracy to an extent significant in high accuracy measuring and checking machines.

18 Claims, 6 Drawing Sheets

SUPPORT ASSEMBLIES

TECHNICAL FIELD

This invention relates to an assembly for supporting elements on a fixture and is particularly but not exclusively concerned with a high accuracy measuring and check machine and the support therein of measuring components and an associated workpiece so as to obviate or mitigate relative movement therebetween.

BACKGROUND ART

Heretofore workpieces have been positioned on machine base structures such that any movement of the base structure is accommodated in movement of the workpiece. Conventionally it has been necessary to construct base structures using heavyweight material such as granite, i.e. material which remains as stable as possible with variations in temperature and, in order to accommodate as far as possible movement in the fixture on which the base structure is located, the latter is conventionally supported on the fixture with minimum restraints. If lightweight base structures can be utilised it may be that workpieces need not be located on the base structure but directly on the fixture, this possibly leading to relative movement between the base structure and the workpiece resulting in loss of accuracy.

SUMMARY OF THE INVENTION

According to the present invention there is provided apparatus for supporting elements on a fixture, the apparatus comprising a first structure for locating at least one of the elements a second structure independent of the first structure for locating at least another of the elements, at least six elongate bars so mounting one of the structures on the fixture as on the other of the structures as to provide restraint against potential space movements of the one structure, and means so mounting the other of the structures on the fixtures as to provide restraint against potential space movements of the other structure, the mounting means being adapted to obviate relative movement between the structures due to movement in the fixture, thereby obviating relative movement between supported elements.

Preferably each of the elongate bars provides compliance in all directions normal to the bar axis but is stiff in the direction of the bar axis. Further six of the bars may mount said other structure on the fixture and a further six of the bars mount said one structure on said other structure.

Further said other structure may be mounted on the fixture by any combination of the bars and anti-vibration mounts totalling six.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
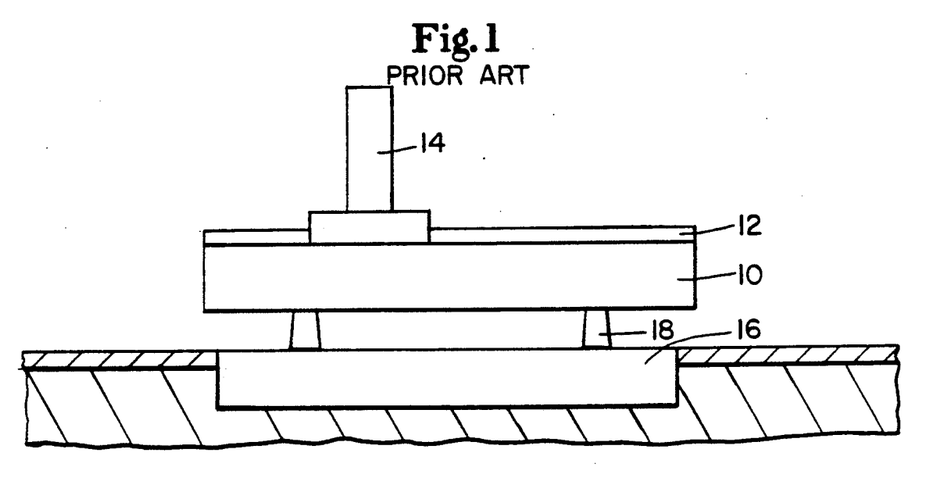
FIG. 1 is a schematic elevation of a conventional prior art co-ordinate measuring machine.

A conventional prior art co-ordinate measuring machine as shown in FIG. 1 can comprise a base structure 10, which provides stationary guideways 12, usually designated as X axis guideways in a rectangular co-ordinate system, and a moving structure 14, normally containing the y and Z guideways of the system, and often being a bridge configuration or column configuration. A carriage (not shown) on the moving structure can mount a probe which is adapted to contact a workpiece. The base structure 10, on which the workpiece is conventionally supported, can itself be supported on a foundation 16 which spreads the load from base structure supports 18 over a suitable area of sub-soil. For heavy structures, the foundation 16 is usually a thick concrete slab.

The freedom of a body to move in space can be defined as six degrees of freedom, i.e. straight line movement in each of the X, Y and Z directions, and rotation about each of the X, Y and Z axes. To completely restrain a body against movement it is necessary to restrain all six degrees of freedom by providing a minimum of six suitably positioned restraints. However it is generally preferred to use the minimum number of restraints, principally in order to accommodate small movements of a body relative to its supporting locations, for example due to differential thermal expansion, without stress or strain, and to accommodate small changes in the relative positions of the support locations without significant changes in the forces, stresses, strains and deflections. In the case of the coordinate measuring machine, if minimum restraints are used, the accuracy of the machine is not significantly affected by normal movements of the foundation, whereas if more than the minimum restraints are used then foundation movements can normally seriously affect the machine accuracy. The foundation can move bodily and distort due to changes in the sub-soil, such as change of level of the water table, or due to chemical or thermal changes in the foundation itself.

Conventionally the base structure of a known co-ordinate measuring machine is supported at three locations by, for example, jacks or air cylinders, whereby if small relative movements occur between the base structure and the foundation in the X or Y directions, such movements are accommodated by the compliance of the support locations in these directions. Friction at the support locations is often sufficient to prevent large movements.

Figure 2:
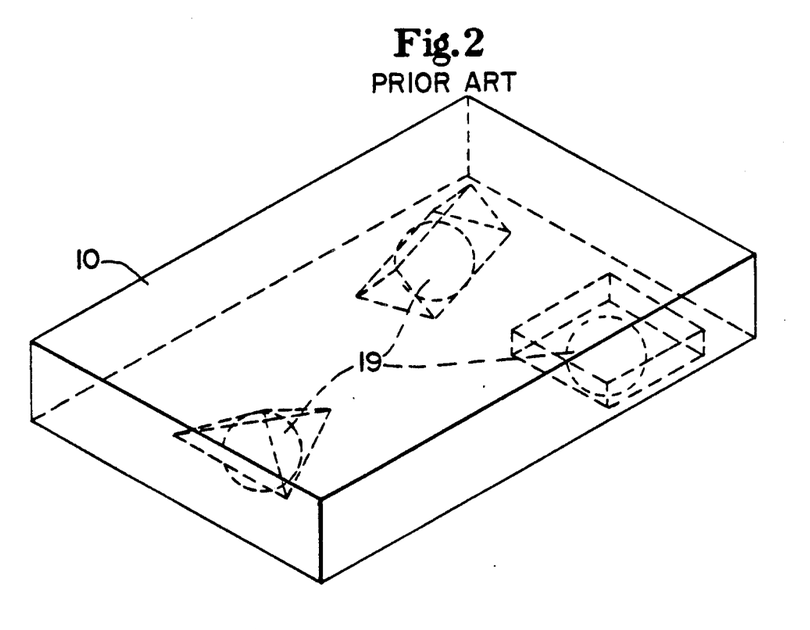
FIG. 2 is a diagrammatic illustration of a known base structure support in such a machine.

In other cases the base structure may need to be located accurately relative to some external body or it may need to be restrained because of seismic activity or other ground borne forces. To completely locate one body relative to another, six suitable positioned restraints are necessary. If the base structure is very heavy, the supports may take the form of large diameter carbide or ceramic spheres 19 engaging surfaces of similar materials. At two of the support locations the spheres may locate respectively in a vee slot and a trihedral hole in the base structure, with the sphere at the other support location engaging a plane surface on the base structure (FIG. 2). The spheres can be rigidly attached to the foundation by bolts or the like, or by seating the spheres in trihedral recesses in the foundation. This provides the six restraints required.

In a co-ordinate measuring machine, the base structure 10 must be made stiff enough to have a negligible deflection under imposed forces which include the weight of the base structure 10 itself, the weight of the moving structure 14, the weight of the workpiece with associated components, and the reactions at the support locations, below the base structure 10, to each of these active forces. If the moving structure 14 is light in weight and a less stiff base structure 10 is used to adequately support the moving structure 14, for example where the machine has a structure described in our co-pending Application entitled "Machine Structure", then if the workpiece is heavy, the deflection of the base structure 10 due to the workpiece will not be negligible. To meet this problem it is possible in principle to support the workpiece on a separate workpiece structure which does not apply any forces to the base structure 10. The workpiece structure can be independently supported by the foundation 16 but it is essential that no significant relative movement occurs between the workpiece structure and the base structure during duration of one set of measurements. Any distortion of the foundation 16 will cause relative movement and significant distortion can occur in a few hours. A worse problem can occur if the base structure 10 must be isolated from ground borne vibrations by supporting the base structure on compliant supports between the foundation 16 and the base structure 10.

Figure 3:
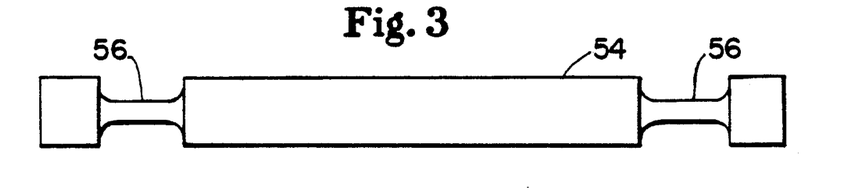
FIG. 3 shows one embodiment of a component for a support assembly according to the invention.

In a support assembly of the present invention, supports in the form of bars, i.e. ties or struts, can be used at the support locations. Referring to FIG. 3, there is shown a bar 54, for example of circular cross-section, which has reduced diameter sections 56 towards respective ends defining hinges which, while the bar 54 is stiff in the direction of its own axis, enables compliance in all directions normal to this axis. To avoid crippling or buckling of the bar 54 under a compressive force, a tensile force can be applied to the bar by means of springs, air cylinders or other suitable means. Thus the weight of the base structure 10 could be supported by springs or the like, leaving the bars 54 to perform the function of location only, whereby the bars 54 can be sufficiently compliant to apply negligible forces to the base structure 10 normal to the bar axis. Alternative constructions of the bars 24 are of course possible and reference in this connection is made to our co-pending Application entitled "Linear Guiding Apparatus".

Figure 4:
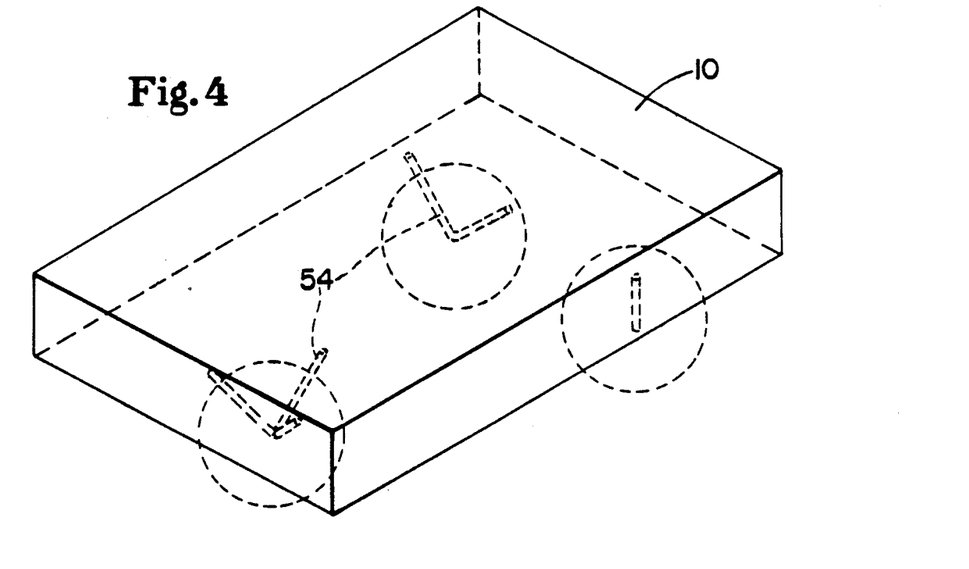
FIG. 4 is a diagrammatic illustration of a support assembly utilising the components of FIG. 3.
Figure 5:
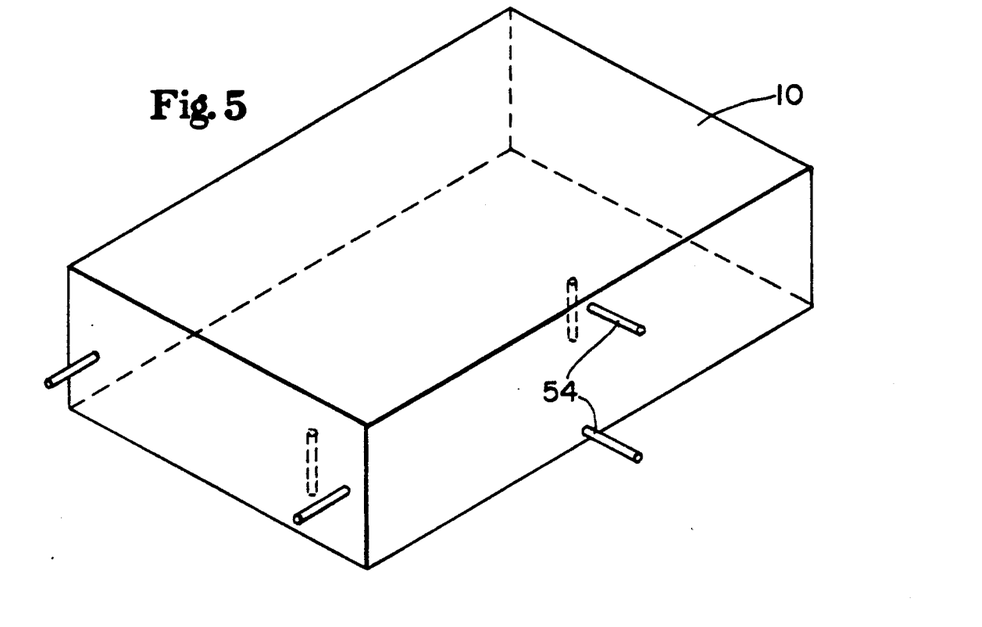
FIG. 5 is another embodiment of a support assembly utilising the components of FIG. 3.

FIG. 4 shows schematically one arrangement of bars 54 providing for six restraints simulating the arrangement of a trihedral recess, vee slot and plane contact surface. FIG. 5 shows schematically an alternative arrangement of bars 54 arranged in three pairs with each pair providing one linear and one angular restraint.

Figure 6:
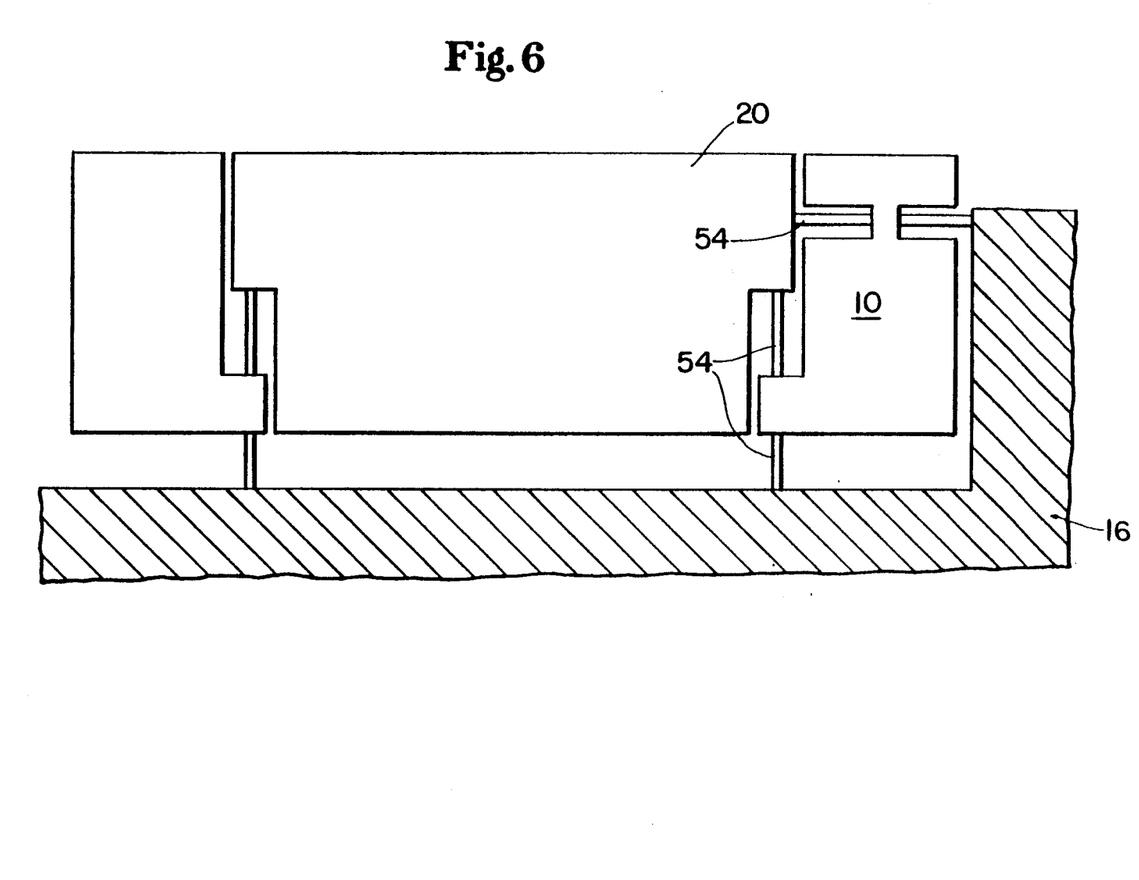
FIG. 6 is a schematic elevation of support assembly according to the invention.
Figure 6A:
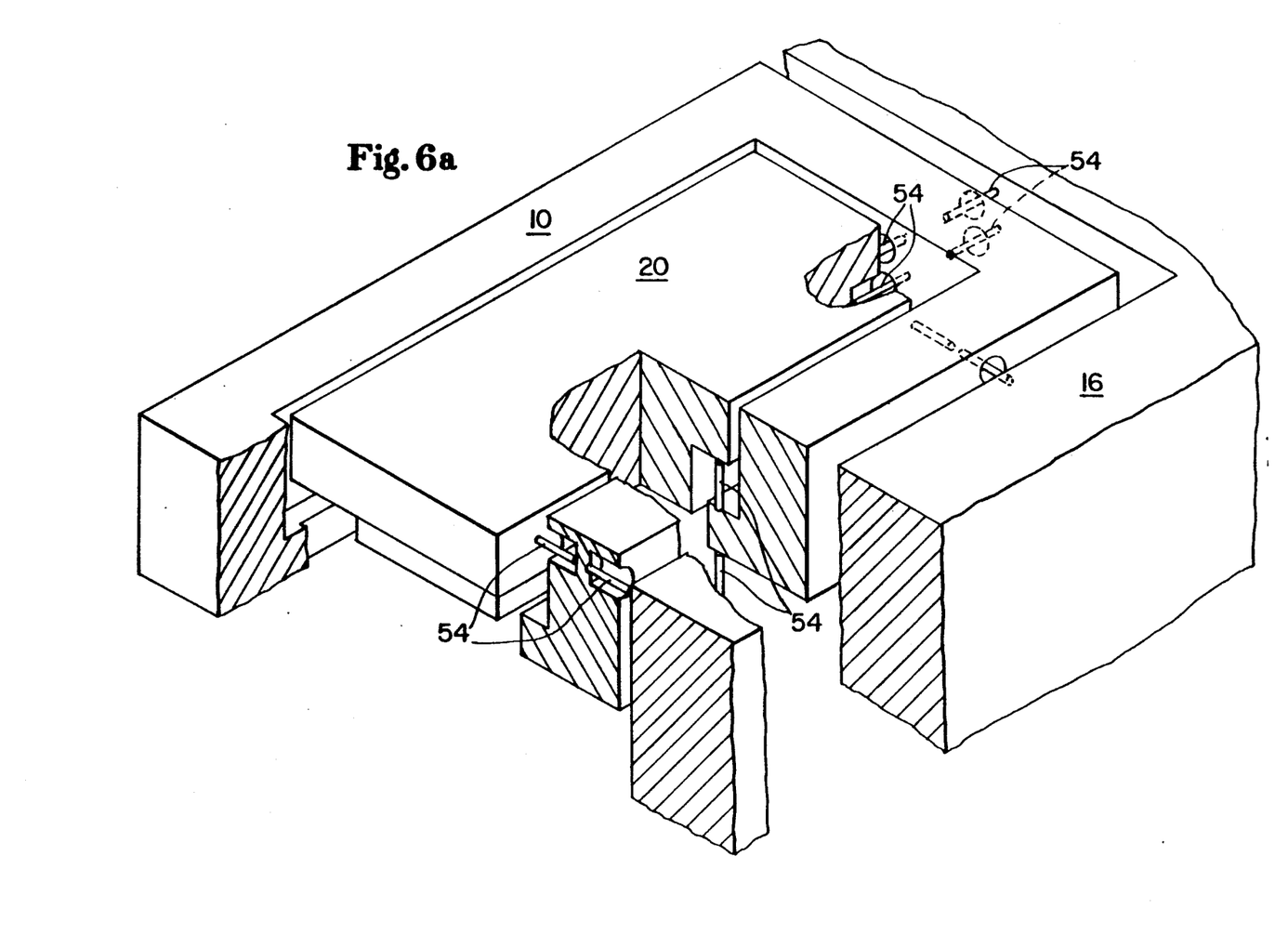
FIG. 6a is a partially broken out perspective view of the support assembly of FIG. 6.

To accommodate the separate workpiece structure 20, components of the base structure 10, as shown in FIG. 6, may be designed to accommodate the arrangement of bars 54 referred to in FIG. 5 (e.g. see FIG. 6a).

The base structure components and the workpiece structure are provided with extension parts between which bars 54 can be located. The vertical weight forces transmitted between the base structure 10 and the workpiece structure 20 are in direct line with the vertical weight forces transmitted between the workpiece structure 20 and the foundation 16.

Figure 7:
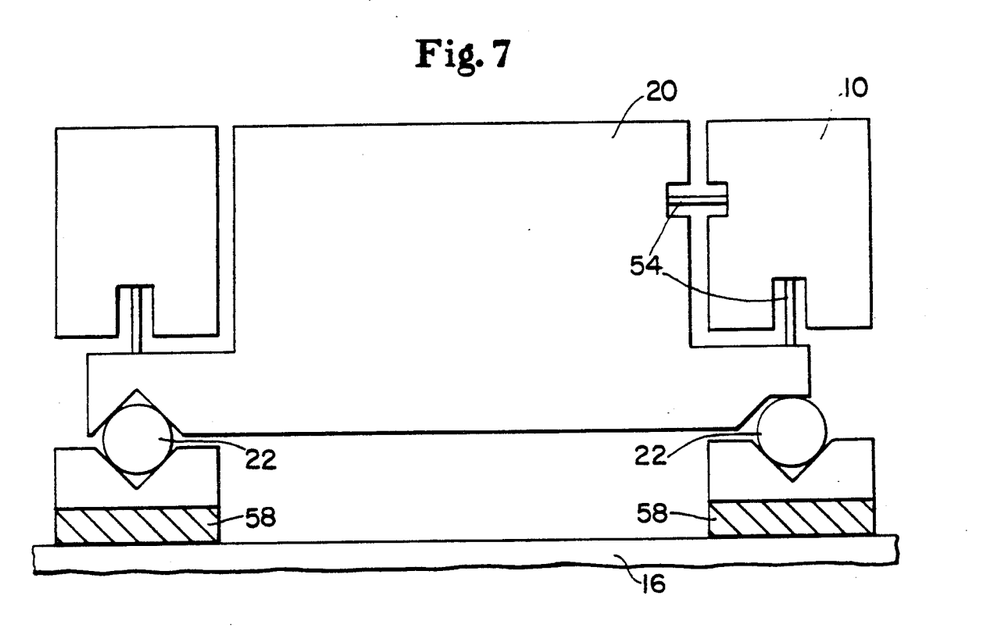
FIG. 7 is a view similar to FIG. 6 showing an alternative support assembly.
Figure 8:
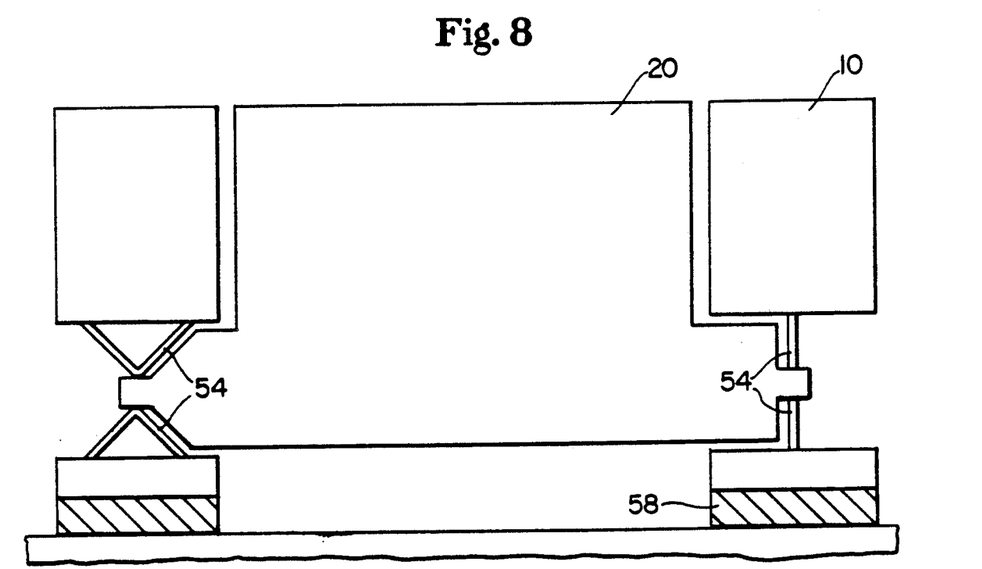
FIG. 8 is a view similar to FIGS. 6 and 7 but showing a yet further example of a support assembly.
Figure 8A:
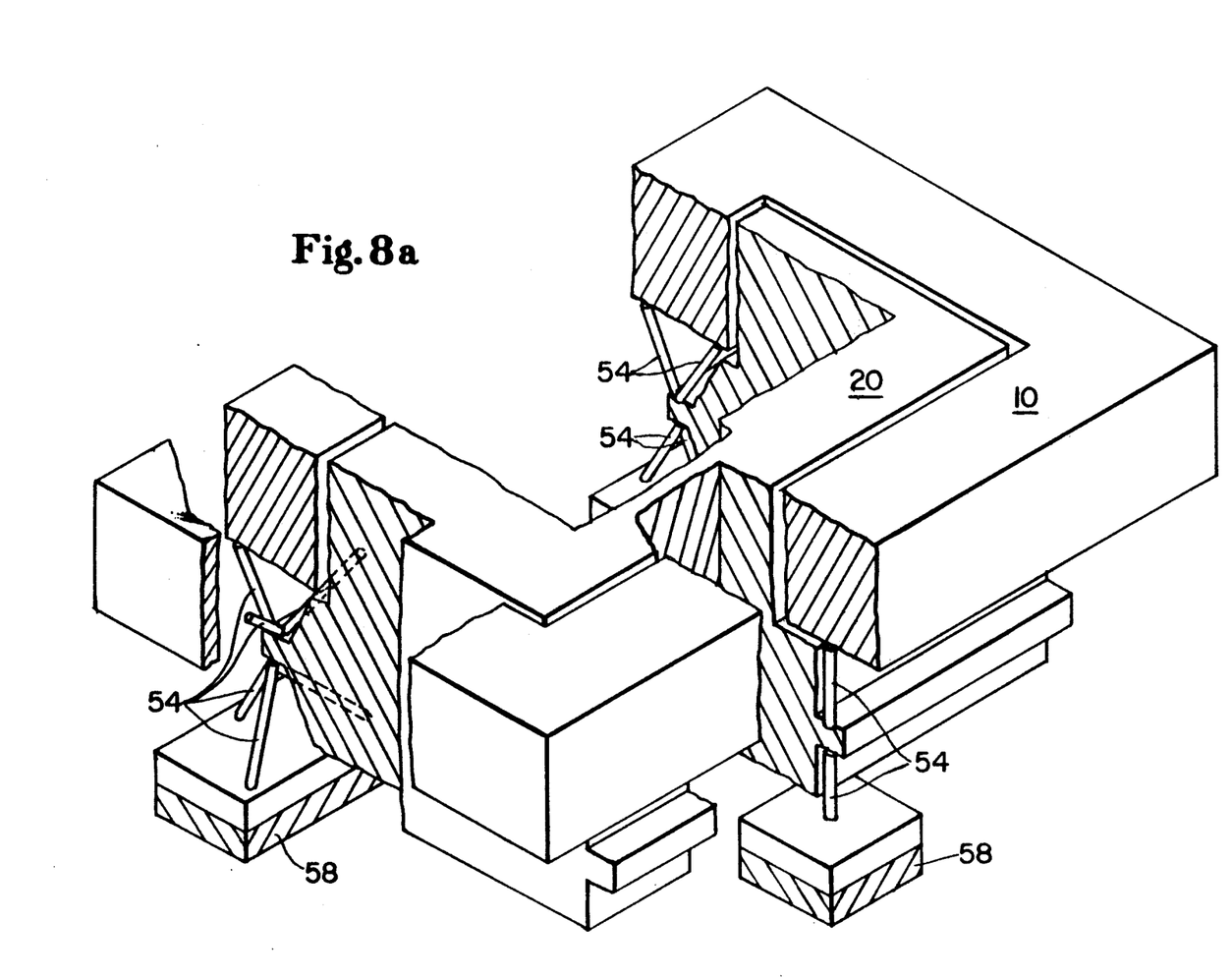
FIG. 8a is a partially broken out perspective view of the support assembly of FIG. 8.

In an alternative arrangement as shown in FIG. 7 the workpiece structure 20 is supported on the foundation 16 through anti-vibration mounts 58. An anti-vibration mount is a piece of compliant material interposed between the foundation or fixture and the structure to prevent or attenuate the transmission of vibrations from the fixture to the structure. It provides vibration isolation and vibration clamping. The isolation implies elasticity and the vibration clamping implies energy absorption. Spherical supports 22 locate in respective trihedral and vee recesses and engage with a plane contact surface as described, while the base structure hereinbefore described, while the base structure components are supported on the workpiece structure 20 by an arrangement of the bars 54. In a further alternative arrangement as shown in FIG. 8, the workpiece structure 20 is supported on the foundation 16 via the mounts 58 by a suitable arrangement of six of the bars 54 similar to the arrangement shown in FIG. 4, while the components of the base structure 10 are supported on the workpiece structure 20 by a similar arrangement of six of the bars 54, thereby giving the six degrees of restraint. FIG. 8a shows the support assembly of FIG. 8 in partially broken out perspective for clarity. Again however because of the use of the vibration isolation mounts 58, the lower six bars 54 can be replaced by nine bars 54 arranged in three tripods. While the workpiece structure 20 can be supported on the foundation 16 by means of the spheres 22 as shown in FIG. 7, or a six bar arrangement as shown in FIGS. 6 and 8, it is to be appreciated that the structure 20 can be supported on the foundation 16 by other arrangements. For example, there may be provided a combination of three bars and three anti-vibration mounts, or six anti-vibration mounts, or any combination of bars and anti-vibration mounts totalling six. When a single anti-vibration mount can deal with both horizontal and vertical vibrations, then a total of 3 anti-vibration mounts may be adequate without any additional mounts or bars. Further the workpiece structure may be Provided with three vee recesses as an alternative to the arrangement described with reference to FIG. 7. In a further alternative the spheres may locate in conical or trihedral recesses in the workpiece structure 20 and either one arrangement of a conical or trihedral recess, a vee recess and a flat on the foundation 16, or three vee recesses on the latter.

It is also to be appreciated that, although the workpiece structure 20 has been described and shown as being supported on the foundation 16 with the base structure 10 supported on the workpiece structure 20, the latter may in fact be supported directly on the foundation 16 and in turn support the workpiece structure 20.

It is also possible for each of the base structure 10 and the workpiece structure 20 to be mounted directly on the foundation 16. In this arrangement each structure is supported by an arrangement of the bars 54 as hereinbefore described.

When the method of using the bars 54 is applied to heavy structure, there can be a problem in providing sufficient strength to support the structures while allowing sufficient lateral compliance to avoid unacceptably large lateral forces, and also having acceptable bending stresses in the bars. For this reason there are used bars of adequate cross-section to support the weight but of considerable length to reduce the lateral forces and the bending stresses for any given lateral displacement. In the case of struts, it is proposed to use large diameter bars of cylindrical or Prismoidal shape with a reduced section at each end to act as an elastic or plastic hinge.

By separating the base structure 10 which carries the accurate measuring devices, from the workpiece structure 20 carrying the workpiece and associated components, and any other heavy items which may vary with each workpiece, and locating the base structure 10 and the workpiece structure 20 relative to each other by no more than six properly oriented restraints, relative movement between the base structure 10 and the workpiece structure 20, which would otherwise result in loss of measuring accuracy, can be avoided.

Various modifications may be made without departing from the invention. For example different arrangements of spherical supports and bar supports can be used and indeed many combinations of the spherical supports and the bar supports can be utilised.

As mentioned hereinbefore, the support apparatus of the invention is particularly suitable for use with a measuring machine having a structure as described in our co-pending U.K. Application No. 8808280 entitled "Machine Structure", and can also benefit from a temperature control arrangement as described in our co-pending U.K. Application No. 8808281 entitled "Support Structures".

I claim:

1. An apparatus for supporting a plurality of elements on a foundation, said elements comprising a workpiece structure for supporting a workpiece and a base structure, said apparatus comprising a first means having a plurality of components for supporting either the workpiece structure or the base structure defining a supported element on said foundation. and a second means for mounting the other of the workpiece structure of the base structure defining a mounted element on the supported element, said first supporting means restraining said supported element against both linear and angular movement relative to said foundation, and said second mounting means comprising six elongate bars for restraining the mounted element against linear movement along and rotation about three mutually perpendicular axes relative to said supported element, thereby obviating relative movement between the elements and said foundation.

2. The apparatus of claim 1, wherein each of the elongate bars has a bar axis along its longitudinal length, and wherein each bar allows limited movement in all directions normal to its bar axis but is stiff in a direction parallel to such axis.

3. The apparatus of claim 1, wherein said first supporting means comprises six elongate bars for supporting said supported element on said foundation, said elongate bars restraining the supported element against linear movement along and rotation about three mutually perpendicular axes relative to said foundation.

4. The apparatus of claims 1 or 2 wherein said first supporting means comprises a plurality of spherical supports.

5. The apparatus of claim 4, wherein said supported element comprises a vee recess and a trihedral recess each receiving and locating a spherical support, and wherein said foundation comprises recesses for receiving and locating said spherical supports in spaced relation.

6. The apparatus of claim 5, wherein a third spherical support is received and located in a corresponding recess in said foundation and engages a substantially planar surface of the supported element.

7. The apparatus of claim 4, wherein said supported element comprises recesses for receiving and locating two spherical supports, and wherein said foundation comprises a v-shaped recess and a separate trihedral recess for receiving and locating said spherical supports in spaced relation.

8. The apparatus of claim 7, further comprising a third spherical support received and located in a corresponding recess in said supported element and engaging a substantially planar surface of said foundation.

9. The apparatus of claim 4 wherein said spherical supports are received and supported in respective vee recesses formed in said supported element and either conical or trihedral recesses formed in said foundation.

10. The apparatus of claim 4, wherein said spherical supports are received and supported in respective vee recesses formed in said foundation and either conical or trihedral recesses formed in said supported element.

11. The apparatus of claim 1, wherein said first supporting means comprises any combination of elongate bars and anti-vibration mounts totalling six.

12. An apparatus for supporting a workpiece structure and a base structure on a foundation, said apparatus comprising a first means having a plurality of components for supporting either the workpiece structure or the base structure defining a supported element on said foundation, and a second means for mounting the other of the workpiece structure or the base structure defining a mounted element on the supported element, said first supporting means restraining said supported element against both linear and angular movement relative to said foundation, and said second mounting means comprising six elongate bars for restraining the mounted element against linear movement along and rotation about three mutually perpendicular axes relative to said supported element, each of said elongate bars having a longitudinal bar axis and being relatively compliant in all directions normal to said axis, but rigid in the direction of said axis, thereby obviating relative movement between the elements and said foundation.

13. The apparatus of claim 12, wherein said bars comprise opposite ends, and a reduced diameter section adjacent each end which acts as an elastic hinge to allow compliance in directions normal to the bar axis.

14. The apparatus of claim 12, wherein said first supporting means comprises six elongate bars for supporting said supported element on said foundation, said elongate bars restraining the supported element against linear movement along and rotation about three mutually perpendicular axes relative to said foundation.

15. The apparatus of claim 12, wherein said first supporting means comprises a plurality of spherical supports.

16. The apparatus of claim 12, wherein said first supporting means comprises any combination of elongate bars and anti-vibration mounts totalling six.

17. An apparatus for supporting a plurality of elements on a foundation, said elements comprising a workpiece structure base structure, said apparatus comprising a first means for supporting either the workpiece structure or the base structure defining a supported element on said foundation, and a second means for mounting the other of the workpiece structure or the base structure defining a mounted element on the supported element, said first supporting means comprising six bars restraining said supported element against both linear and angular movement relative to said foundation, and said second mounting means comprising six elongate bars for restraining the mounted element against linear movement along and rotation about three mutually perpendicular axes relative to said supported element of said foundations.

18. The apparatus of claim 17, wherein each of the elongate bars has a bar axis along its longitudinal length, and wherein each bar allows limited movement in all directions normal to its bar axis but is stiff in a direction parallel to such axis.

* * * * *

UNITED STATES PATENT AND TRADEMARK OFFICE
CERTIFICATE OF CORRECTION

PATENT NO. : 5,063,683

DATED : November 12, 1991

INVENTOR(S) : James Bury

It is certified that error appears in the above-identified patent and that said Letters Patent is hereby corrected as shown below:

Column 5 - Claim 1 - Line 44 - "structure of" should be deleted and replaced with --structure or--.

Column 6 - Claim 9 - Line 21 - "claim 4" should be deleted and replaced with --claim 4,--.

Column 7 - Claim 17 - Line 1 - "structure base" should be deleted and replaced with --structure and a base--.

Column 8 - Claim 17 - Line 4 - "of said foundations" should be deleted and replaced with --and said foundation--.

Signed and Sealed this

Thirtieth Day of March, 1993

*Attest:*

STEPHEN G. KUNIN

*Attesting Officer*          *Acting Commissioner of Patents and Trademarks*